United States Patent

Meya

Patent Number: 5,931,283
Date of Patent: Aug. 3, 1999

[54] SCRAPER-CHAIN ASSEMBLY FOR SCRAPER-CHAIN CONVEYORS

[75] Inventor: Hans Meya, Werne, Germany

[73] Assignee: DBT Deutsche Bergbau—Technik GmbH, Lunen, Germany

[21] Appl. No.: 09/003,535

[22] Filed: Jan. 6, 1998

[30] Foreign Application Priority Data

Feb. 7, 1997 [DE] Germany ............... 197 04 590

[51] Int. Cl.⁶ .................................................. B65G 19/24
[52] U.S. Cl. ............................................................ 198/731
[58] Field of Search ................................... 198/728, 731, 198/733

[56] References Cited

U.S. PATENT DOCUMENTS

| | | | |
|---|---|---|---|
| 4,867,300 | 9/1989 | Braun et al. | 198/731 |
| 5,213,199 | 5/1993 | Braun et al. | 198/731 |
| 5,699,895 | 12/1997 | Materne et al. | 198/731 |

*Primary Examiner*—James R. Bidwell
*Attorney, Agent, or Firm*—Bauer & Schaffer, LLP

[57] ABSTRACT

The invention relates to a scraper-chain assembly for scraper-chain conveyors, in particular central or double central scraper-chain conveyors, having a scraper connection to horizontal chain links of the single-strand or two-strand chain assembly. Vertical chain links hooked into the horizontal chain links are provided with longitudinal limbs which have a non-round cross-section, and whose thickness dimension is smaller than that of nose parts of these chain links that connect the longitudinal limbs. For the scraper connection, the scrapers have coupling and locking pins, which extend through internal openings of the horizontal chain links, between the hooked-in vertical chain links and which protrude from the internal openings to form locking pieces which serve to secure the scrapers. In this case, the width of the locking pieces is designed to match the configuration of the horizontal and vertical chain links in such a way that the coupling and locking pins of the scrapers can be pushed freely into the internal openings of the horizontal chain links, when the vertical chain links hooked into these internal openings are pivoted out of the chain axis into a vertical position. By pivoting the vertical chain links back into the normal position, positive locking of the scrapers to the horizontal chain links automatically results.

19 Claims, 2 Drawing Sheets

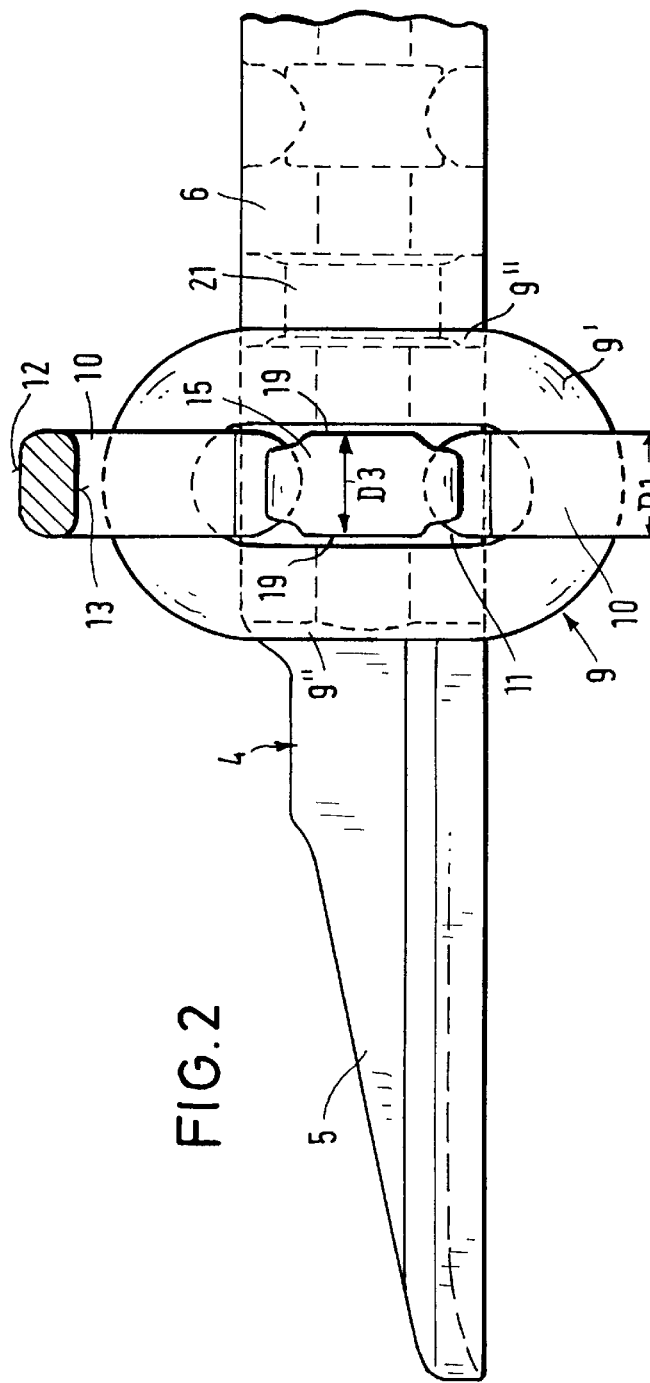
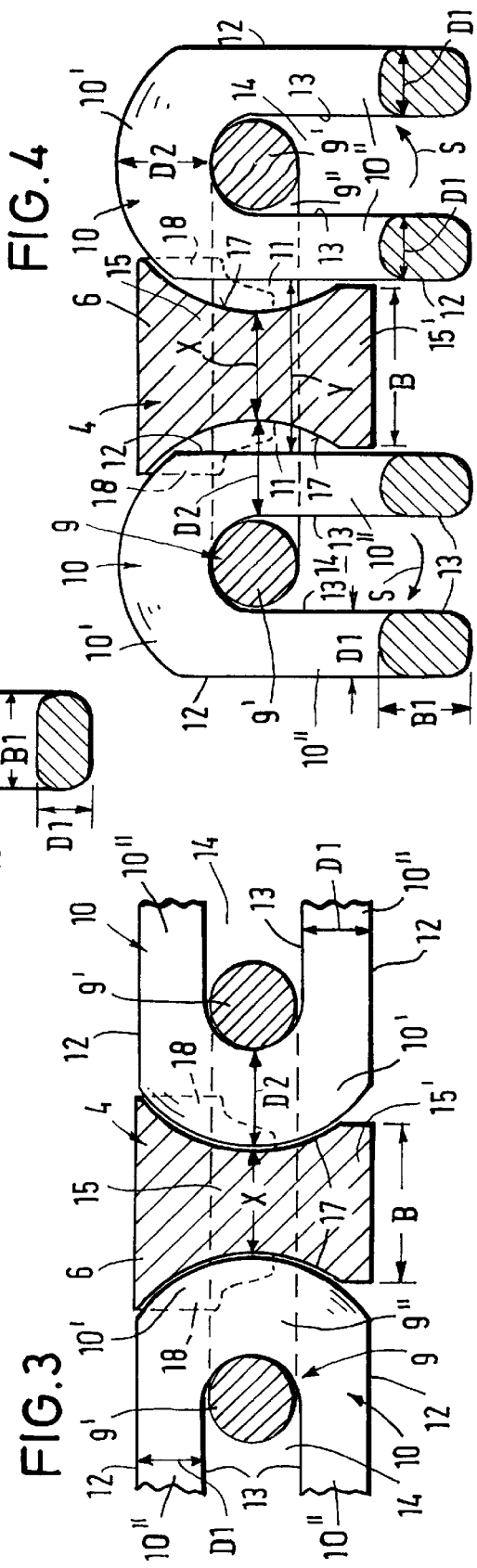

5,931,283

SCRAPER-CHAIN ASSEMBLY FOR SCRAPER-CHAIN CONVEYORS

FIELD OF THE INVENTION

The invention relates to a scraper-chain assembly for scraper-chain conveyors, in particular central or double central scraper-chain conveyors.

The scraper-chain assembly of the invention is particularly, although not necessarily exclusively, useful for high-capacity scraper-chain conveyors, which are used in underground mining and here primarily in faces of great face lengths.

BACKGROUND OF THE INVENTION

Whereas in the past link chains in standard sizes, produced from round wire, were used for the scraper chains of scraper-chain conveyors, in the case of mining conveyors a change was already made a long time ago to using link chains with a special shaping of the chain links for the scraper-chains, in order to meet the continuously increasing requirements on the chain strengths. In the case of more recent known scraper-chain conveyors, in order to be able to use thicker chains, which would meet the increased power demand on the scraper-chain conveyors, it has been proposed in the prior art to flatten the vertical chain links of the chains on their parallel longitudinal limbs and accordingly, without reducing the cross-section, to reduce them in their overall height to a dimension which corresponds to a standardized round-link chain of lower chain thickness (DE 32 34 137 C3, DE 36 15 734 C2, "Glückauf" magazine 1991, p.189).

Numerous scraper designs with different connections of the scrapers to the scraper-chain assembly are known for the scraper-chain conveyors used for example in mining. Most common are scrapers which are detachably and exchangeably connected to the chain links, generally the horizontal chain links, of the single-strand or two-strand chain assembly, with the aid of screw-on parts, such as screw-on chain shackles or closure bars (DE 19 37 608 B2, DE-U 81 34 429.5, DE-A 23 22 898, DE-U 1 949 166). Such multi-part scraper designs are complicated in terms of production and, because of the use of the screw-on parts, require a relatively great effort on assembly when connecting the scrapers to the scraper-chain assembly, and above all also when changing a scraper.

SUMMARY OF THE INVENTION

Starting from a scraper-chain assembly of the generally known type, which is preferably intended for use in mining in high-capacity scraper-chain conveyors, the invention is based on the object of constructing a scraper-chain assembly giving a reliable scraper connection to the single-strand or two-strand scraper chain, without relying on screw-on parts or the like. Another object is to provide a scraper-chain assembly with a comparatively simple scraper design, and which is preferably also distinguished by simplifications to the assembly when connecting a scraper or changing a scraper.

With the scraper-chain assembly according to the invention, it is possible for the scraper connection to be made without the use of screw-on parts and screw connections, as a result of the configuration on the one hand of the scraper and on the other hand of the scraper chain. The high-tensile connection of the scraper to the single-strand or two-strand scraper chain is in this case performed with the aid of coupling pins, which are arranged firmly on and preferably in one piece with, the scrapers. The coupling pins are engaged in internal openings of respective horizontal chain links of the chain assembly, and serve to secure the scraper to the chain assembly. The coupling pins of the scrapers therefore themselves act as locking elements or locking pieces. The coupling pins may be designed in such a way that they can be engaged without problems into the internal openings of the horizontal chain links, and in the present invention are adapted to be engageable when the vertical chain links linked with the horizontal chain links are pivoted out of their normal position in the chain axis with the scraper chain relieved of tension, that is to say with a loose chain, the links being pivoted relative to one another to such an extent that the longitudinal limbs of the vertical links engage behind the nose parts of the horizontal chain links, in their internal openings. The arrangement is adapted so that this relative pivoting increases the clearance in the internal openings of the horizontal chain links, allowing the coupling and locking pins to be pushed into the internal openings to connect a scraper.

In order to secure the scrapers in their connecting and operating position on the chain assembly, the pivoted-out vertical chain links are then pivoted back in to their normal position, that is to say to lie along the chain axis, as a result of which the parts of the coupling pins forming the locking pieces pass into the locking position, in which the pin engagement is secured as a result of a positive locking engagement between nose parts of the vertical chain links and the coupling pins or their locking pieces, and thus the scrapers are locked to the chain assembly against lifting off from the latter.

Hence, according to the invention, an extremely simple and at the same time reliable scraper connection to the chain assembly may be provided, which may also allow the relatively simple exchanging of the scrapers in operational use. At the same time, the scrapers may be designed relatively simply. In this case, the scrapers are preferably constructed in one piece with their coupling and locking pins.

The abovementioned configuration of the chain assembly, with positive locking of the scraper connections, results on the one hand, from the shaping of the coupling and locking pins of the scrapers and, on the other hand, from the configuration of the scraper chain, whose vertical chain links, as is known per se, have flattened longitudinal limbs with a thickness dimension that is smaller than the thickness dimension or the diameter of the arcuate nose parts of these chain links connecting the longitudinal limbs. This provides the possibility, in the said pivoted-out position of the vertical chain links, of introducing the coupling and locking pins, firmly arranged on the scrapers, with eg. their broadened locking pieces, into the internal openings of the horizontal chain links and then of securing the pin engagement and hence the scraper connection by pivoting back the vertical chain links into the chain axis.

In the scraper-chain assembly according to the invention, use is preferably made of the form of chains that are known per se in the mining field, comprising vertical chain links having arcuate nose parts with a circular cross-section which are connected by parallel longitudinal limbs, each of which has a non-round flattened cross-section whose thickness is smaller and whose width is greater than the diameter of the circular cross-section of their nose parts. In this case, the usual chain eyes with circumferentially circular cross-section may be used for the horizontal chain links, which are provided with oval internal openings. It is generally recommended to dimension the pitch of the horizontal chain links to be greater than that of the vertical chain links.

In a preferred embodiment of the scraper-chain assembly according to the invention, the scrapers are provided with top webs or the like reaching over the scraper-chain assembly, these webs or the like carrying the coupling and locking pins that are directed towards the bottom of the conveyor channel to extend through the internal openings of the horizontal chain links from above. In this case, therefore, to connect the scrapers they are pushed from above onto the chain assembly, their coupling and locking pins engaging the internal openings of the horizontal chain links from above.

On the other hand, however, it is possible for the scrapers to be provided with bottom webs or the like reaching under the chain assembly, which carry the coupling and locking pins reaching through the internal openings of the horizontal chain links from above.

If the coupling and locking pins are located on the top web of the scrapers, reaching over the chain assembly, then the coupling and locking pins preferably have locking pieces at their lower end, and are of a length such that these locking piece ends are approximately in the plane of the scraper foot, so that improved driving of debris by the scrapers in their connection region to the chain assembly may be provided in conveying operations.

In a further advantageous refinement of the invention, the coupling and locking pins are provided, on their opposite sides facing the vertical chain links, with reduced bearing sections which are trough-shaped, matched to the arcuate outer contour of the nose parts of the vertical chain links and are intended to be supported on the nose outer faces of the vertical chain links. These reduced bearing sections preferably extend into the top region of the scraper. This measure helps to correctly position the scrapers and aids their firm seating in the connected state. It is also advantageous from this point of view if the scrapers are provided with supporting wall parts reaching over the nose parts of the vertical chain links on the outside, the said supporting wall parts preferably extending from the top face of the scraper as far as the plane of the associated horizontal chain link or somewhat beyond the latter.

The coupling and locking pins are preferably matched in their cross-section to the internal openings of the horizontal chain links, and have a thickness which corresponds at least approximately to the internal width of the internal openings of the horizontal chain links.

As mentioned, the scrapers are preferably formed in one piece.

If the coupling and locking pins are arranged on the top web of the scraper, then the latter may have, underneath the top web, a pocket recess which is preferably open towards the bottom of the conveyor channel, and through which the vertical coupling and locking pins extend. This pocket is preferably intended to accommodate the chain assembly and to have the latter pass through it. The pocket recesses of the scrapers are in this case preferably also open towards the driver side and towards the opposite rear side of the scrapers, and are substantially closed by the coupling and locking pins, so that the reliable entrainment of debris in conveying operations is also ensured in the central scraper region bridged over by the top web.

If the scraper-chain assembly according to the invention is used in a central chain scraper conveyor, then the scrapers in each case may have a single coupling and locking pin, which is arranged in the centre of the scraper. In the case of a two-strand scraper-chain assembly for double central chain scraper conveyors, each scraper may be provided with two coupling and locking pins, which are arranged with a small lateral spacing from one another. In the latter case a spacer is preferably arranged on each scraper, between the two coupling and locking pins. The spacer preferably extends downwardly from the web carrying the pins and is formed parallel to the pins and in one piece with the scraper. The thickness of the spacer is preferably smaller than that of the coupling and locking pins.

In addition, it is preferred to provide the scrapers, on their top or bottom webs carrying the coupling and locking pins, with trough-like, shaped chain-bed recesses to accommodate the longitudinal limbs of the horizontal chain links.

Further preferred configuration features of the invention are specified in the individual claims and emerge from the following description of the exemplary embodiment shown in the drawings.

BRIEF DESCRIPTION OF THE DRAWINGS

FIG. 2 is a partial top view of the scraper-chain assembly of FIG. 1 showing an individual scraper connected to the scraper-chain assembly;

FIG. 3 is a vertical section through the scraper and its coupling and locking pin along the line III—III of FIG. 1; and FIG. 4 shows, in the sectional illustration of FIG. 3, the pivoted-out position, enabling the scraper connection, of the vertical chain links that are hooked into the horizontal chain link.

DETAILED DESCRIPTION OF THE EMBODIMENT

Figure 1:
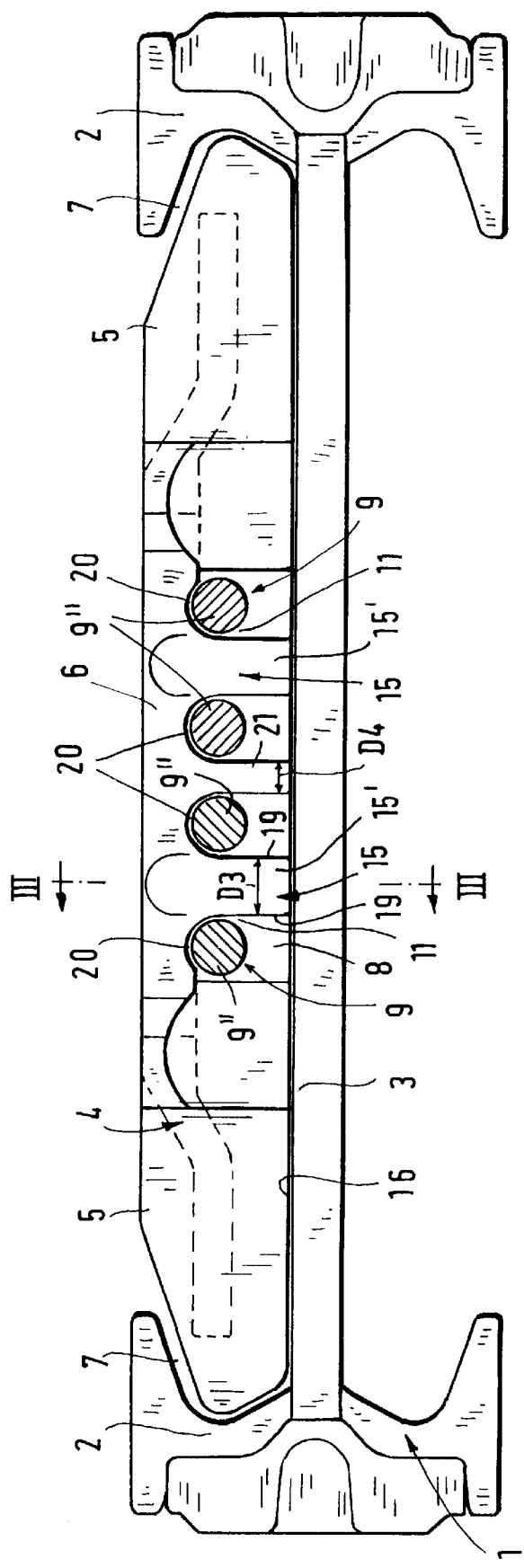
FIG. 1 shows a two-strand scraper-chain assembly according to an embodiment of the invention, for a double central chain scraper conveyor, viewed from the debris driver side of the scraper, together with the conveyor channel of the scraper-chain conveyor.

FIG. 1 shows a conveyor channel 1, of a scraper-chain conveyor having the bottom 3 of the conveyor channel welded in between the two side profiles 2, on which the debris is conveyed in the upper run by means of the driven, endless scraper chain assembly. The scraper chain conveyor here comprises a double central chain scraper conveyor with two endless scraper chains circulating in the central region of the conveyor channel and thus forming a two-strand chain assembly, to which the individual scrapers 4 are connected. The scrapers are of one-piece design and each have a top web 6 connecting the two scraper wings 5 in one piece in the top region of the scraper. The two scraper wings 5, as usual, are guided in guide channels 7 of the side profiles 2 of the conveyor channel. Underneath the top web 6, the scrapers 4 each have a pocket recess 8 which is open towards the bottom 3 of the conveyor channel and towards the debris driver side, as well as towards the opposite rear side of the scraper, so that the two-strand scraper-chain assembly can pass through.

The two scraper chains forming the two-strand chain assembly in each case comprise, in a per se known way, link chains having eye-like horizontal chain links 9 and eye-like vertical chain links 10 hooked into the former in an articulated manner.

In the exemplary embodiment shown, the horizontal chain links 9 have, running around over their arcuate nose parts 9' and their parallel longitudinal limbs 9" connecting the latter, a constant circularly round cross-section, as is the case in the conventional standardized round-link chains.

The vertical chain links 10, which are hooked into the internal openings 11 of the horizontal chain links 9 in an articulated manner and are arranged perpendicular to the plane of the bottom 3 of the conveyor channel, are flattened at their parallel longitudinal limbs 10", connected via the arcuate nose parts 10', as is likewise known, and have an at least approximately rectangular or slightly oval cross-section with the flat outer face 12 and the flat inner face 13, parallel thereto, which bounds the internal opening 14 of these chain links 10 at the sides. The two cross-sectional faces 12 and 13 can be connected at their two ends in each case via a convexly rounded cross-sectional face, as shown by FIG. 4. Instead of this, the vertical chain links 10 may also have different cross-sectional shapes, however.

What is of primary significance is that the vertical chain links 10 hooked into the horizontal chain links 9 in an articulated manner are provided with longitudinal limbs 10" that are non-round in cross-section, and whose thickness dimension D1 is smaller than the thickness dimension D2 of the nose parts 10' of these chain links 10.

The arcuate nose parts 10' preferably have a circularly round cross-section of diameter D2.

The cross-sectional dimensioning of the longitudinal limbs 10" of the vertical chain links 10 perpendicular to the plane of the drawing is considerably greater than the thickness dimension D1. This width dimension is indicated by B1 in FIG. 4. Because of the flattened cross-sectional shape of the longitudinal limbs 10", the vertical chain links 10 have an external width which is distinctly smaller than the external width of the horizontal chain links 9, whose pitch dimension is expediently greater than that of the vertical chain links.

Scraper chains of the type described above are known per se from the printed documents cited at the beginning as belonging to the prior art. The conventional chains which are known in mining under the description "compact supporting chains" and are shown and described, inter alia, in the magazine "Glückauf", 1991, p.189, can be used with particular advantage for the scraper-chain assemblies according to the invention.

The scrapers 4 each have on their central top web 6 two vertical coupling and locking pins 15, which are arranged with a parallel side spacing from one another and are of identical design, and are expediently connected in one piece to the top web 6. When the scrapers 4 are connected to the chains, the coupling and locking pins 15 extend through the horizontal chain links 9, located in the pocket recesses 8, of the two scraper chains forming the two-strand chain assembly, as is shown in FIGS. 1 to 3. This produces the high-tensile coupling of the scrapers 4 to the endless scraper chains.

As best seen in FIGS. 1 and 3, the vertical coupling and locking pins 15 have such a length that their lower free ends are located approximately in the plane of the scraper foot 16 or the bottom 3 of the channel. The ends of the coupling and locking pins projecting downwards out of the internal openings 11 of the horizontal chain links 9 form locking pieces 15', which serve to secure the scrapers 4 connected to the two-strand scraper chain assembly in their working position. As FIGS. 3 and 4 show, the parts of the coupling and locking pins 15 that are located underneath the relevant horizontal chain link 9 and which form the locking pieces 15' are broader than portions of these pins which are located above the locking pieces 15' in the region which extends through the horizontal chain links 9, to be specific they have a bottom width B.

It can be seen from FIG. 3 that the locking pieces 15' formed by the free lower end regions of the coupling and locking pins 15 in each case grip behind the nose parts 10' of the two vertical chain links 10, which are hooked into the relevant horizontal chain link 9, in a manner offset in height with respect to their longitudinal central plane, that is to say underneath the associated horizontal chain link 9, which achieves a positive locking of the scrapers 4 in the normal course of the scraper chains, in which the vertical chain links 10, as shown in FIG. 3, are located in the chain axis of the tensioned scraper-chain assembly. It is therefore not possible for the scrapers 4 to be lifted upwards with their coupling and locking pins 15 out of the internal openings 11 of the horizontal chain links 9 serving for the scraper connection, or to migrate upwards in conveying operations.

FIG. 4 shows, in the sectional illustration of FIG. 3, the installation situation when connecting the scrapers 4 to the scraper-chain assembly. In this case, the two-strand scraper-chain assembly has been relieved of load and loosened to such an extent that the two vertical chain links 10 can be pivoted downwards, with respect to the horizontal chain link 9 remaining in its horizontal position, in the direction of the bottom 3 of the conveyor channel. In this vertical pivoted-out position, the longitudinal limbs 10", previously located at the bottom, of the two vertical chain links 10 are located in the internal opening 11 of the horizontal chain element, adjacent the arcuate nose parts 9' of the horizontal chain link 9 in its internal opening. It can be seen that when the two vertical chain links 10 linked into the common horizontal chain link 9 are in the vertical pivoted-out position shown, there is a clearance Y between the outer faces 12 of the longitudinal limbs 10" in the internal opening 11 of the horizontal chain link 9. The width of this clearance is greater than the width B of the locking piece 15' formed at the lower end of coupling and locking pin 15, with the result that the scraper 4 with the locking piece 15' of the scraper 4 can be pushed through the internal opening 11 of the horizontal chain link 9 from above and brought into the position according to FIG. 4 in which the scraper 4 is located in its working position on the scraper-chain assembly. If subsequently the two vertical chain links 10, located in the vertical pivoted-out position, are pivoted back in the direction of the arrow S into their normal position in the scraperchain assembly, shown in FIG. 3, in which position they are located in the chain axis, then this produces the securing of the scraper connection automatically, since in this normal position the nose parts 10' are located in the internal opening 11 of the horizontal chain link and, as a result, the clearance between the two vertical chain links 10 hooked into the horizontal chain link is reduced to the smaller clearance X shown in FIG. 4, which is smaller than the width dimension B of the locking piece 15', which thus grips under the nose parts 10' of the vertical chain links 10, pivoted back into the chain axis, underneath the plane of the horizontal chain link 9.

It can be seen that the above described scraper connection, with the locking of the scraper to the coupling and locking pins 15, is enabled on the one hand by the configuration of the coupling and locking pins and on the other hand by the configuration of the scraper chains, since their vertical chain links 10 have a greater thickness D2 at the nose parts 10' formed by the round arcs than at their longitudinal limbs 10", whose thickness dimension is designated by D1. In order to be able to replace any scrapers damaged in operational use, following the relieving and loosening of the scraper-chain assembly, it is necessary in each case only for the two relevant vertical chain links 10 to be pivoted out of the normal chain course into the position according to FIG. 4, that is to say approximately into the position perpendicular to the bottom 3 of the conveyor channel. In this pivoted-out position of the vertical chain links hooked in each case into the common horizontal chain link 9, the broader clearance Y is once more present in the internal opening 11 of this horizontal chain link 9, with the result that the scraper 4, together with the two coupling and locking pins 15, may be lifted upwards out of the internal openings 11 of the horizontal chain links 9.

It can be seen in particular from FIGS. 3 and 4 that the coupling and locking pins 15 of the scraper 4, directed towards the bottom 3 of the conveyor channel, have trough-shaped reduced bearing sections 17 on their opposite sides facing the two vertical chain links 10, which are trough-shaped, matched to the convex arcuate outer contour of the nose parts 10' of these vertical chain links 10 and into which the nose parts 10' pivot when the two vertical chain links 10 are pivoted back from the pivoted-out position according to FIG. 4 into the normal position in the chain course according to FIG. 3. The scrapers 4 can therefore be supported with their coupling and locking pins 15 on the arcuate outer faces of the nose parts 10' of the vertical chain links 10 during conveying operation, which results in a beneficial positional stabilisation of the scrapers 4 being achieved in the state in which they are connected to the scraperchain assembly. In addition, it can be seen that the trough-shaped reduced bearing sections 17 extend upwards from the transition point, located below the plane of the horizontal chain link 9, to the locking piece 15', as far as into the top web 6 of the scraper 4, and here run out at the sides on the upper side of the top web. Furthermore, it can be seen, in particular from FIGS. 3 and 4, that the scrapers 4 are provided with supporting wall parts 18 which bound the reduced bearing sections 17 at the sides, engage over the nose parts 10' of the vertical chain links 10 on the outside, extend from the upper side of the top web 6 into the internal opening 11 of the horizontal chain link 9 and, in the exemplary embodiment shown, are offset in a stepped manner. These supporting wall parts 18, which are arranged firmly and expediently in one piece on the scraper or its coupling and locking pin, serve the mutual side support of the scrapers and of the vertical chain links 10 associated with these, in particular during conveying operation, as a result of which additional positional securing of the scrapers in the connected state can be achieved.

Furthermore, FIGS. 1 and 2 show that the coupling and locking pins 15 of the scrapers 4 have a non-round cross-section, to be precise an approximately rectangular cross-section having a thickness D3 which corresponds approximately to the internal width of the internal opening 11 of the horizontal chain link 9. The side faces 19, facing the two longitudinal limbs 9" of the horizontal chain link 9, of the coupling and locking pins 15 are constructed as vertical flat side faces which, according to FIG. 1, run out arcuately in the upper region of the coupling and locking pins into groove-like shaped chain-bed recesses 20 on the underside of the top web 6, into which the relevant horizontal chain link 9 is laid with its two longitudinal limbs 9" in the state in which the scraper is connected.

In the case of the two-strand scraper-chain assembly illustrated, a spacer 21 is arranged on, preferably in one piece with, the top web 6, in the centre of the scraper between the two scraper chains, which are arranged at a small lateral spacing from each other. The said spacer 21 serves to space the two horizontal chain links 9, to which the scraper 4 is connected, at a lateral spacing from each other.

Its thickness D4 is considerably smaller than the thickness D3 of the coupling and locking pins 15. The spacer 21 also extends as far as or in the vicinity of the bottom 3 of the conveyor channel. It can be seen that, as a result of the broad coupling and locking pins 15 and the spacer web 21, the pocket recess 8 of the scraper 4 that is located underneath the top web 6 is largely closed towards its driver side, with the result that here the driver function of the scraper is not markedly influenced during conveying operation.

As can be seen from FIG. 3, the scraper has over its entire length a height which at least approximately corresponds to the height or external width of the vertical chain links 10. However, a design in which the scrapper projects beyond the vertical chain links 10 is also possible.

It goes without saying that the invention is not restricted to the exemplary embodiment described above, but rather that the latter can undergo changes in various aspects, without departing from the scope of the invention. This also applies to the configuration of the scraper chains and to the associated scrapers.

In the case of a single-strand scraper-chain assembly for central chain scraper conveyors, for example, each scraper preferably has only a single coupling and locking pin 15 arranged in the centre of the scraper. It is also possible for the scrapers to be provided with bottom webs or bottom bars engaging underneath the scraper-chain assembly, and which carry the coupling and locking pins 15 extending through the internal openings 11 of the horizontal chain links 10 from below. In this case, too, a scraper connection is possible with the vertical chain links 10 pivoted out vertically, and locking of the scraper connection is possible by pivoting back these vertical chain links into the normal course of the scraper-chain assembly in the manner described. What is primarily significant for the configuration of the single-strand or two-strand scraper-chain assembly is that the vertical chain links, which are hooked in an articulated manner into the horizontal chain links serving for the scraper connection have at their nose parts a thickness dimension D2 that is greater than the thickness dimension D1 of their longitudinal limbs 10", with the result that the clearance in the internal opening 11 of the horizontal chain link can be adjusted, by pivoting the vertical chain links, from the normal dimension x to the greater dimension Y, which enables insertion of the coupling and locking pins into the internal openings of the horizontal chain links.

I claim:

1. A scraper chain assembly for scraper-chain conveyors, said assembly comprising at least one chain, and a plurality of scrapers detachably mounted on said chain;

said at least one chain comprising a plurality of vertical chain links and a plurality of horizontal chain links, linked in alternation to one another in an articulated manner, each said vertical chain link comprising co-planar longitudinal limbs joined at their ends by nose parts, said limbs and said nose parts each having a thickness dimension in the plane of the limbs, said thickness dimension of the longitudinal limbs being smaller than said thickness dimension of said nose parts, and each said horizontal chain link having an internal opening through which vertical chain links to either side of said horizontal chain link pass to interlink the vertical and horizontal chain links and form the chain;

said scrapers having coupling and locking pins which engage the internal openings of respective horizontal chain links, and extend therethrough, portions of said coupling and locking pins protruding from said openings and serving as locking portions for securing the scrapers on said chain;

the or each said horizontal chain link engaged by a respective said coupling and locking pin having the vertical chain links passing through its internal opening pivotable relative to said horizontal chain link in the plane of their longitudinal limbs between an in-line position and a position transverse thereto, in said in-line position respective nose parts of said vertical chain links being located in said internal opening of said horizontal chain link and defining therebetween a first clearance through said internal opening, and in said transverse position respective longitudinal limbs of said vertical chain links being located in said internal opening of said horizontal chain link and defining therebetween a second clearance through said internal opening greater than said first clearance, said locking and coupling pin being located between said vertical chain links passing through said internal opening and in the direction of said clearances said locking portion of said pin having a width which is greater than said first clearance and smaller than said second clearance.

2. A scraper-chain assembly according to claim 1, wherein each scraper and its associated coupling and locking pin or pins are formed as a one-piece unitary part.

3. A scraper-chain assembly according to claim 1, wherein said scrapers comprise top webs extending over said chain, said top webs carrying said coupling and locking pins, said coupling and locking pins being directed towards the bottom of a conveyor channel and extending through said internal openings of said horizontal chain links from above.

4. A scraper-chain assembly according to claim 1 wherein said scrapers comprise bottom webs extending under said chain, said bottom webs carrying said coupling and locking pins, and said coupling and locking pins extending through said internal openings of said horizontal chain links from below.

5. A scraper-chain assembly according to claim 3, wherein each said scraper has a foot below said top web and said coupling and locking pins have a length such that their locking portions lie approximately in the plane of a respective scraper foot.

6. A scraper-chain assembly according to claim 1 wherein said nose parts of said vertical chain links have arcuate outer contours and said coupling and locking pins have, on their opposite sides facing the vertical chain links, trough-shaped reduced bearing sections matched in shape to said arcuate outer contour of said nose parts of said vertical chain links, whereby said coupling and locking pins are supported on said outer contour of said nose parts.

7. A scraper-chain assembly according to claim 1 wherein said locking portion is formed by an end of said coupling and locking pin and engages behind respective nose parts of said vertical chain links passing through the horizontal chain link.

8. A scraper-chain assembly according to claim 1 wherein said nose parts of said vertical chain links are arcuate and have a circular cross-section, and said longitudinal limbs are parallel and have a non-round flattened cross-section whose thickness is smaller and whose width is greater than the diameter of said circular cross-section of said nose parts.

9. A scraper-chain assembly according to claim 1, wherein said horizontal chain links have a circular cross-section all the way around.

10. A scraper-chain assembly according to claim 1, wherein the pitch of said horizontal chain links is greater than that of said vertical chain links.

11. A scraper-chain assembly according to claim 3, wherein said scrapers comprise, in the region of said top webs carrying said coupling and locking pins, pocket recesses which are open towards the bottom of the conveyor channel and towards their rear side and towards their driver side, said coupling and locking pins extending vertically in said pocket recesses, and said chain passing through said pocket recesses.

12. A scraper-chain assembly according to claim 1, wherein said scrapers are provided with supporting wall parts bounding the nose parts of the vertical chain links on the outside thereof.

13. A scraper-chain assembly according to claim 1 wherein said horizontal chain links comprise longitudinal limbs to either side of their internal openings, and said coupling and locking pins are of non-round cross-section, and have a thickness which corresponds approximately to the internal width of said internal openings between said longitudinal limbs of said horizontal chain links.

14. A scraper-chain assembly according to claim 13, wherein said coupling and locking pins have flat side faces on their sides facing the two longitudinal limbs of said horizontal chain links.

15. A scraper-chain assembly according to claim 1 comprising two chains forming a two-strand chain assembly, wherein said scrapers each comprise a pair of said coupling and locking pins arranged one either side of the scraper centre, and a spacer between said pair of pins and parallel thereto.

16. A scraper-chain assembly according to claim 15, wherein said spacer has a thickness smaller than that of said coupling and locking pins.

17. A scraper-chain assembly according to claim 15 wherein each said scraper has a foot and said spacer webs end approximately in the plane of said scraper foot.

18. A scraper-chain assembly according to claim 1 wherein said scrapers are provided, on top or bottom webs thereof, on both sides of said coupling and locking pins, with trough-shaped, chain-bed recesses to accommodate said longitudinal limbs of said horizontal chain links.

19. A scraper-chain assembly according to claim 1 wherein said scrapers have a height that corresponds approximately to the height or external width of said vertical chain links.

* * * * *